(12) United States Patent
Idota et al.

(10) Patent No.: US 10,158,222 B2
(45) Date of Patent: Dec. 18, 2018

(54) SURGE PROTECTIVE DEVICE AND SURGE PROTECTIVE SYSTEM

(71) Applicant: SANKOSHA CORPORATION, Tokyo (JP)

(72) Inventors: Kouji Idota, Tokyo (JP); Shin Nakayama, Tokyo (JP)

(73) Assignee: SANKOSHA CORPORATION, Tokyo (JP)

( * ) Notice: Subject to any disclaimer, the term of this patent is extended or adjusted under 35 U.S.C. 154(b) by 278 days.

(21) Appl. No.: 15/298,934

(22) Filed: Oct. 20, 2016

(65) Prior Publication Data

US 2017/0117700 A1    Apr. 27, 2017

(30) Foreign Application Priority Data

Oct. 26, 2015  (JP) .................................. 2015-209970

(51) Int. Cl.

| H02H 3/00 | (2006.01) |
|---|---|
| H02H 3/22 | (2006.01) |
| H01R 13/04 | (2006.01) |
| H01R 13/10 | (2006.01) |
| H01R 31/06 | (2006.01) |
| H01T 4/06 | (2006.01) |
| H02H 9/04 | (2006.01) |
| H02H 9/06 | (2006.01) |
| H01C 7/12 | (2006.01) |

(52) U.S. Cl.
CPC .............. *H02H 3/22* (2013.01); *H01R 13/04* (2013.01); *H01R 13/10* (2013.01); *H01R 31/06* (2013.01); *H01T 4/06* (2013.01); *H02H 9/042* (2013.01); *H02H 9/06* (2013.01); *H01C 7/12* (2013.01)

(58) Field of Classification Search
CPC ........................................................ H02H 3/22
See application file for complete search history.

(56) References Cited

U.S. PATENT DOCUMENTS

| 7,453,368 B2 * | 11/2008 | Baldwin .............. H02H 1/0053 338/21 |
|---|---|---|
| 7,961,111 B2 * | 6/2011 | Tinaphong ............. H02H 9/042 340/638 |
| 8,239,150 B2 * | 8/2012 | Baumheinrich ... G01R 29/0842 324/72 |

(Continued)

FOREIGN PATENT DOCUMENTS

| DE | 102008031200 A1 | 1/2010 |
|---|---|---|
| JP | 2013-077483 A | 4/2013 |

*Primary Examiner* — Stephen W Jackson
(74) *Attorney, Agent, or Firm* — AEON Law, PLLC; Adam L.K. Philipp

(57) ABSTRACT

A surge protective device (SPD) includes a jack and a plug detachably attached by insertion to the jack. Inside the plug, a protection circuit which protects equipment to be protected against intruding lightning surge, a degradation detecting unit which detects a degradation state of the protection circuit, a display unit which displays the detection result, or the like, are provided. When a plurality of SPDs are installed together, a juncture plug which detachably connects between juncture terminals within the adjacent SPDs is provided. The detection result of the degradation detecting unit within the plug is output to an outside through a third connection terminal within the plug, a first connection terminal and the juncture terminal within the jack and the juncture plug.

16 Claims, 17 Drawing Sheets

(56) References Cited

U.S. PATENT DOCUMENTS

| | | | |
|---|---|---|---|
| 8,275,548 B2* | 9/2012 | Marshall | G01W 1/16 |
| | | | 324/72 |
| 8,611,062 B2* | 12/2013 | Bishop | G01R 15/183 |
| | | | 361/93.6 |
| 8,730,638 B2 | 5/2014 | Higashi et al. | |
| 8,842,017 B2* | 9/2014 | Lee | G01R 31/1236 |
| | | | 324/117 R |

* cited by examiner

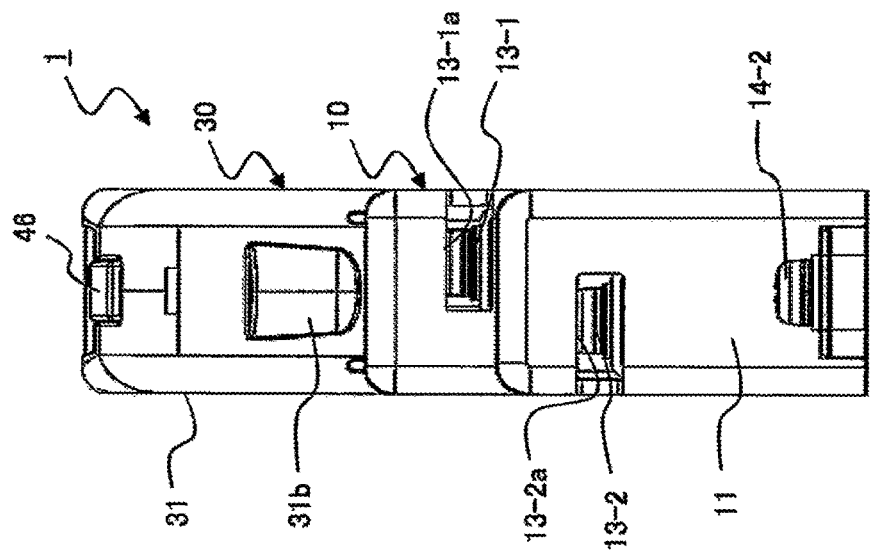
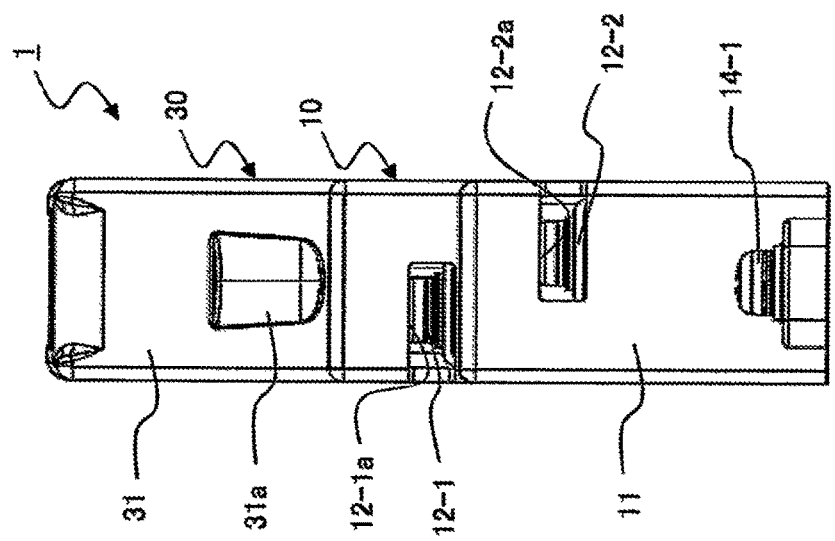

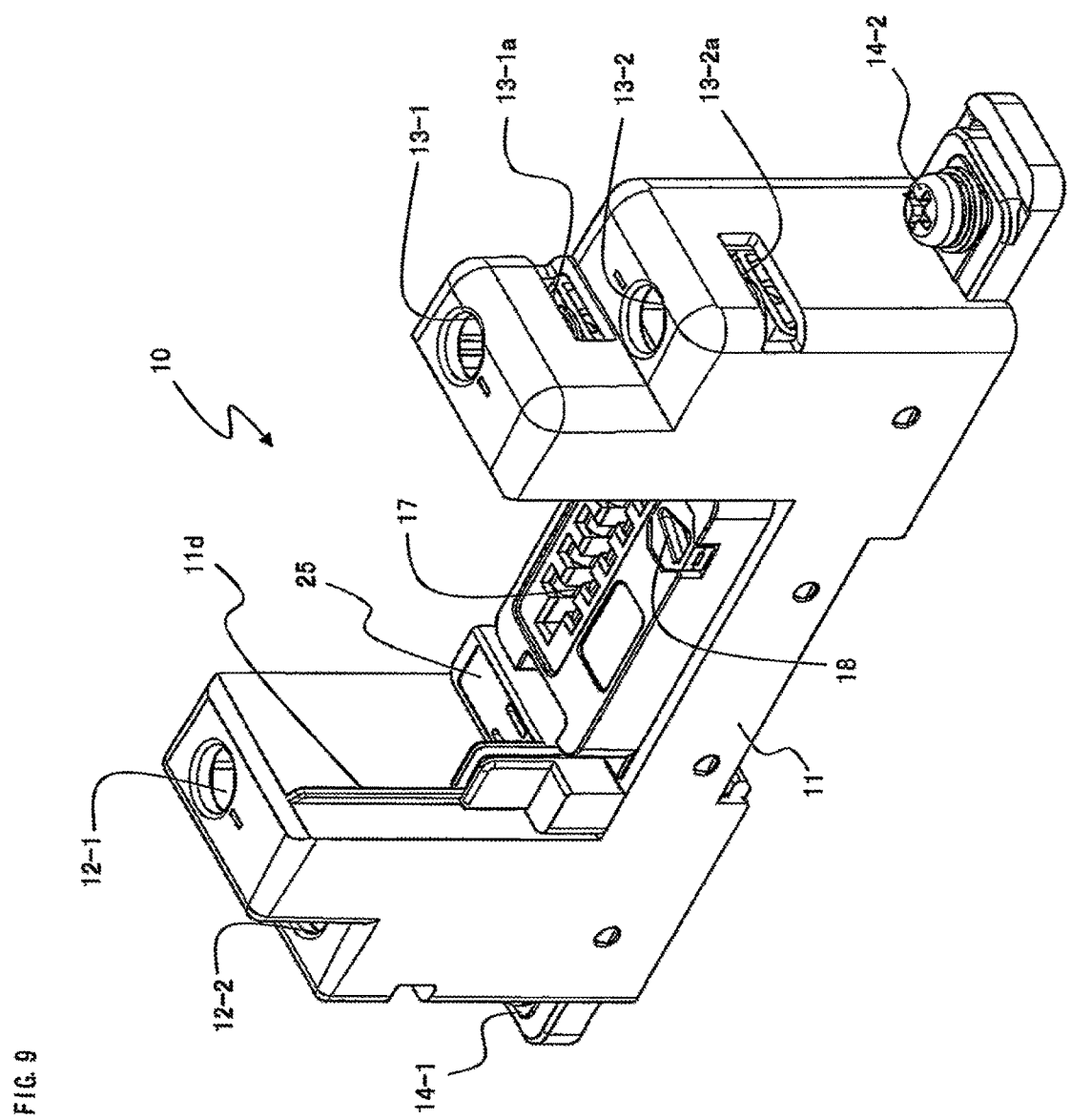

SURGE PROTECTIVE DEVICE AND SURGE PROTECTIVE SYSTEM

BACKGROUND OF THE INVENTION

Field of the Invention

The present invention relates to a surge protective device (hereinafter, referred to as an "SPD") for communication for protecting equipment to be protected such as communication equipment and control equipment against intrusion of lightning surge, and a surge protective system in which a plurality of SPDs for communication are installed together.

Description of the Related Art

Conventionally, for example, Japanese Patent No. 5778541 and U.S. Pat. No. 8,730,638 B2 disclose an SPD for power supply for protecting equipment to be protected such as power supply equipment against intrusion of lightning surge, and a surge protective system in which a plurality of SPDs are installed together.

The conventional surge protective system includes a plurality of SPDs which are installed together, and a monitor unit which displays degradation states of the plurality of SPDs and which supplies power supply voltages to the plurality of SPDs. The bottom faces of the plurality of SPDs and the bottom face of the monitor unit are detachably attached to, for example, a mounting rail for devices. A sensor unit for detecting intrusion of lightning surge at each SPD and the monitor unit are connected through a power cable for supplying a power supply voltage and a communication cable for transmitting a communication signal. Power is supplied from the monitor unit to each SPD, and lightning surge detection data is transmitted from the sensor unit of each SPD to the monitor unit through the power cable and the communication cable.

However, the conventional surge protective system has the following problems of (A) to (C).

(A) Problem of Workability

In the conventional SPD, a connection of the power cable and the communication cable is embedded into a bottom face side of the sensor unit. Therefore, it is necessary to lay the power cable and the communication cable, for example, in a state where the SPD body is detached from the mounting rail for devices, which leads to poor workability.

(B) Difficulty in being Used in a Communication System (that is, Used as an SPD for Communication)

When the conventional SPD is used in lines of a power system (that is, used as an SPD for power supply), because it is only necessary to provide two or three connections of SPDs, there needs to be less points where the power cable and the communication cable are laid, which does not take a lot of troubles for work. However, when the conventional SPD is used in a communication system, because the number of lines is extremely larger than that of the power system (for example, several tens to several hundred lines may be required), there needs to be an extremely large number of connections of the SPDs, which makes it difficult to lay the power cable and the communication cable.

(C) Difficulty in Annexing Work

Work of annexing an SPD is difficult because it is necessary to extend the power cable and the communication cable from those already provided.

SUMMARY OF THE INVENTION

Therefore, to solve the above-described problems of the related art, an object of the present invention is to provide an SPD which has favorable workability in laying cables, with which cables can be easily laid even when the number of connections increases, and, with which annexing work is easy, and to provide a surge protective system.

To achieve the above-described object, the SPD of the present invention includes a jack and a plug.

The jack has an external line side terminal to which an external line configured with a communication line or a control line is connected, an equipment side terminal to which equipment to be protected is connected, a first connection terminal, a second connection terminal, and a juncture terminal connected to the first connection terminal. The plug has a third connection terminal detachably connected to the first connection terminal, a fourth connection terminal detachably connected to the second connection terminal, a protection circuit which discharges lightning surge intruding from the external line side terminal or the equipment side terminal through the second connection terminal and the fourth connection terminal to a ground side to protect the equipment to be protected, a degradation detecting unit which detects intrusion of the lightning surge and detects a degradation state of the protection circuit by comparing a history of the lightning surge with a reference value, and a display unit which displays a detection result of the degradation detecting unit.

The SPD of the present invention is characterized in that, when a plurality of SPDs are installed together, a juncture plug which detachably connects between the adjacent juncture terminals in the adjacent SPDs is provided, and the detection result of the degradation detecting unit is output through the third connection terminal, the first connection terminal, the juncture terminals and the juncture plug.

The surge protective system of the present invention is characterized in that a plurality of SPDs are installed together, and a power supply unit which supplies the power supply voltage to the plug and which transmits the detection result of the degradation detecting unit to an outside is provided.

Further, another aspect of the surge protective system of the present invention is characterized in that a plurality of SPDs are installed together, and a power supply unit which transmits the detection result of the degradation detecting unit to an outside is provided.

According to the SPD and the surge protective system of the present invention, because a communication line or a power/communication line which has been conventionally laid using cables can be connected through wearing of the juncture plug, the following advantageous effects of (a) to (d) can be expected.

(a) Because a cable is not used in the communication line or the power/communication line of the SPD, it is possible to save trouble for wiring.

(b) Because it is not necessary to extend a cable of the communication line or the power/communication line when an SPD is annexed, the SPD can be easily annexed.

(c) As a result of work for installing an SPD being simplified, workability is improved.

(d) Because trouble for laying work in the communication line or the power/communication line is reduced, for example, an SPD having a function of replacement recommendation display or a function of contact output to a distance can be attached to a location where there are several tens to several hundred lines in a communication system, or the like.

The above-described and other objects and new features of the present invention will become more apparent from the following description of the preferred embodiments in con-

BRIEF DESCRIPTION OF THE DRAWINGS

FIG. 5 is a left side view of an SPD 1 in FIG. 1;

FIG. 6 is a right side view of the SPD 1 in FIG. 1;

FIG. 9 is a perspective view illustrating a state where a juncture plug 25 is loaded to the SPD side jack 10 in FIG. 2;

DETAILED DESCRIPTION OF THE PREFERRED EMBODIMENTS

First Embodiment
(Configuration of First Embodiment)

Figure 1:
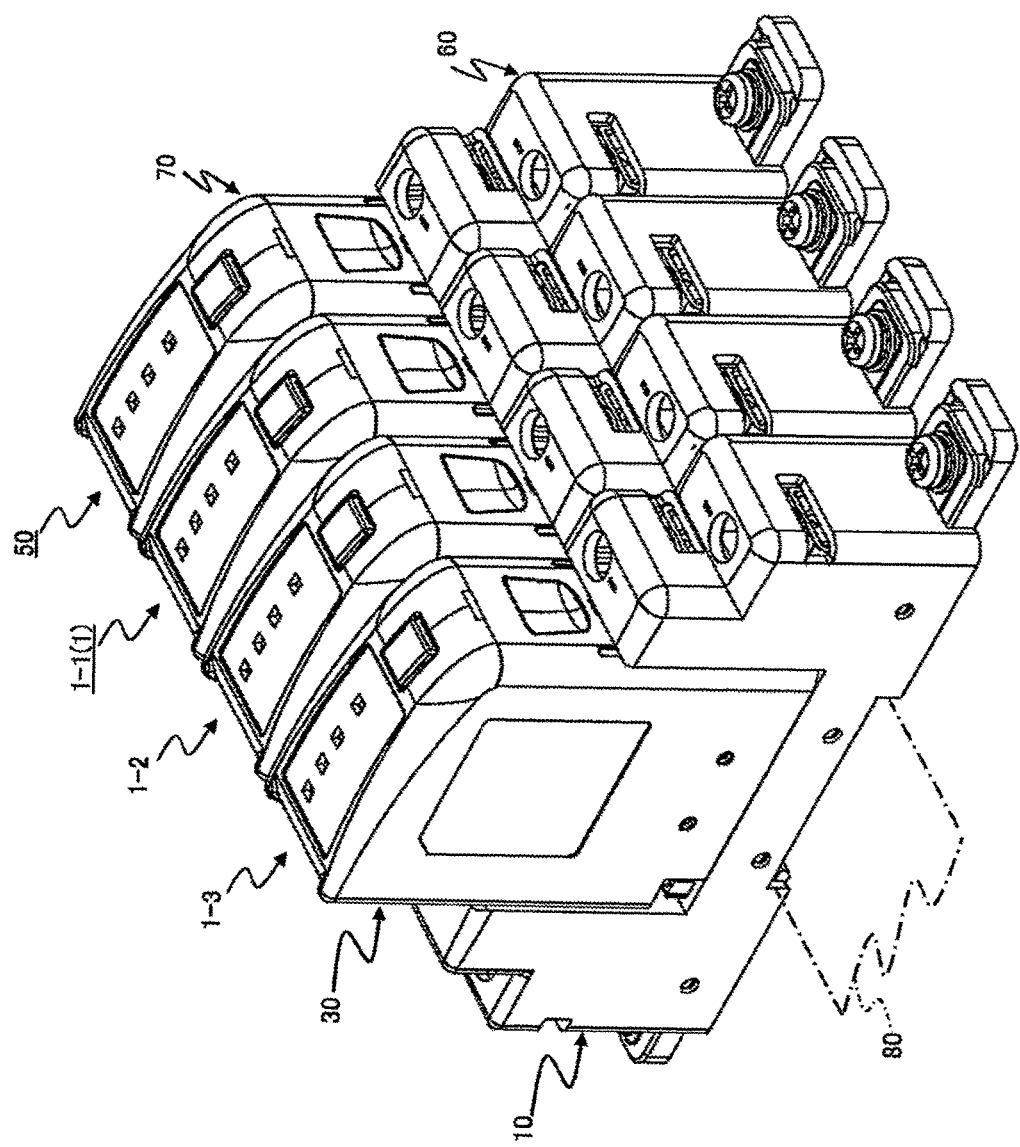
FIG. 1 is a perspective view illustrating a surge protective system driven by an external power supply according to a first embodiment of the present invention.
Figure 2:
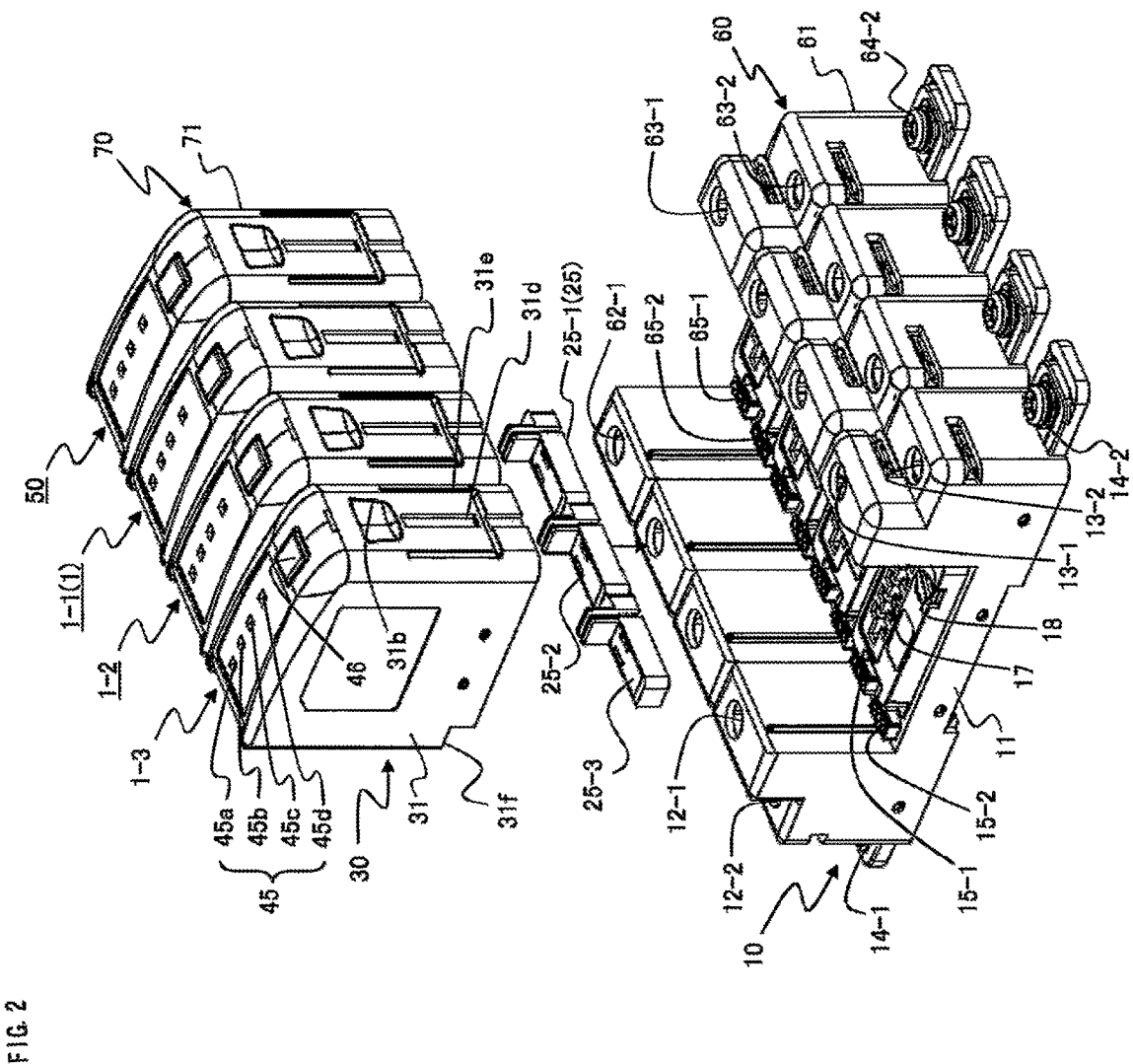
FIG. 2 is a perspective view illustrating the system in FIG. 1 in a separated manner.
Figure 3:
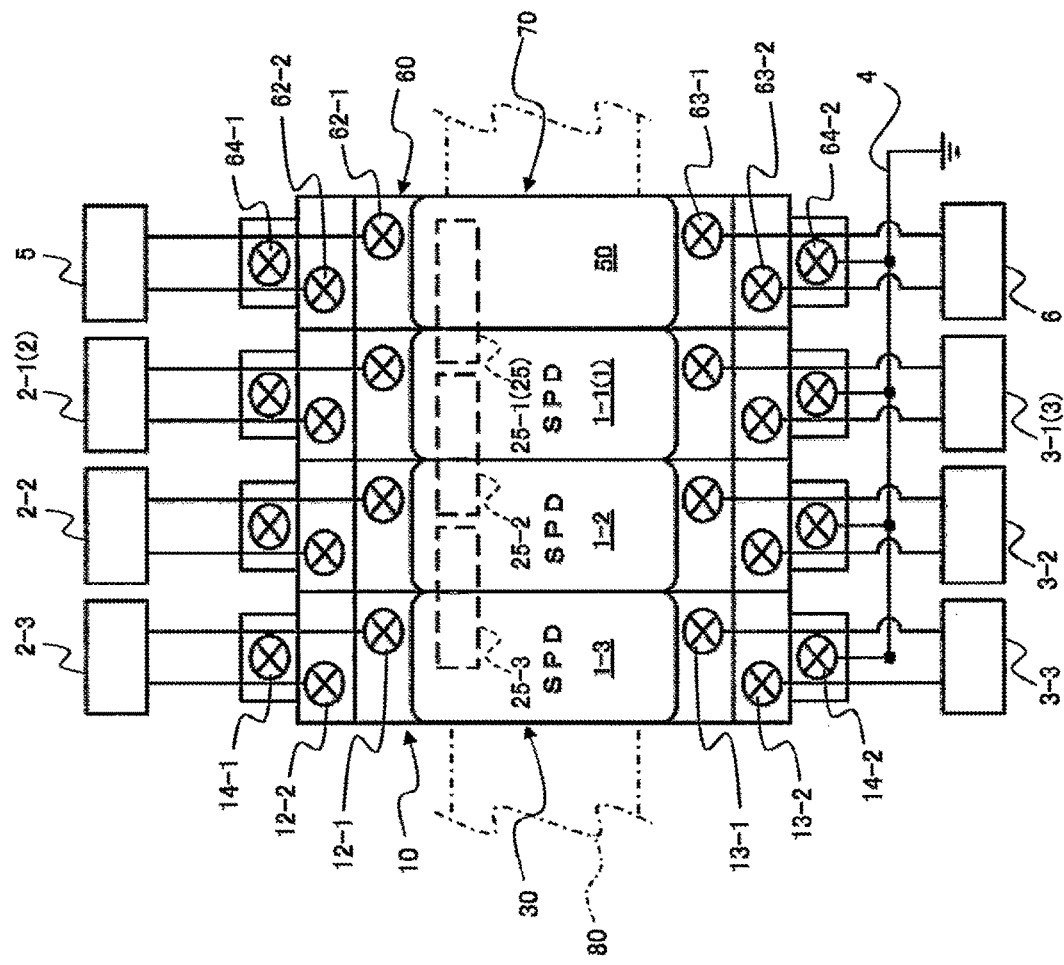
FIG. 3 is a schematic plan view of the system in FIG. 1.
Figure 4:
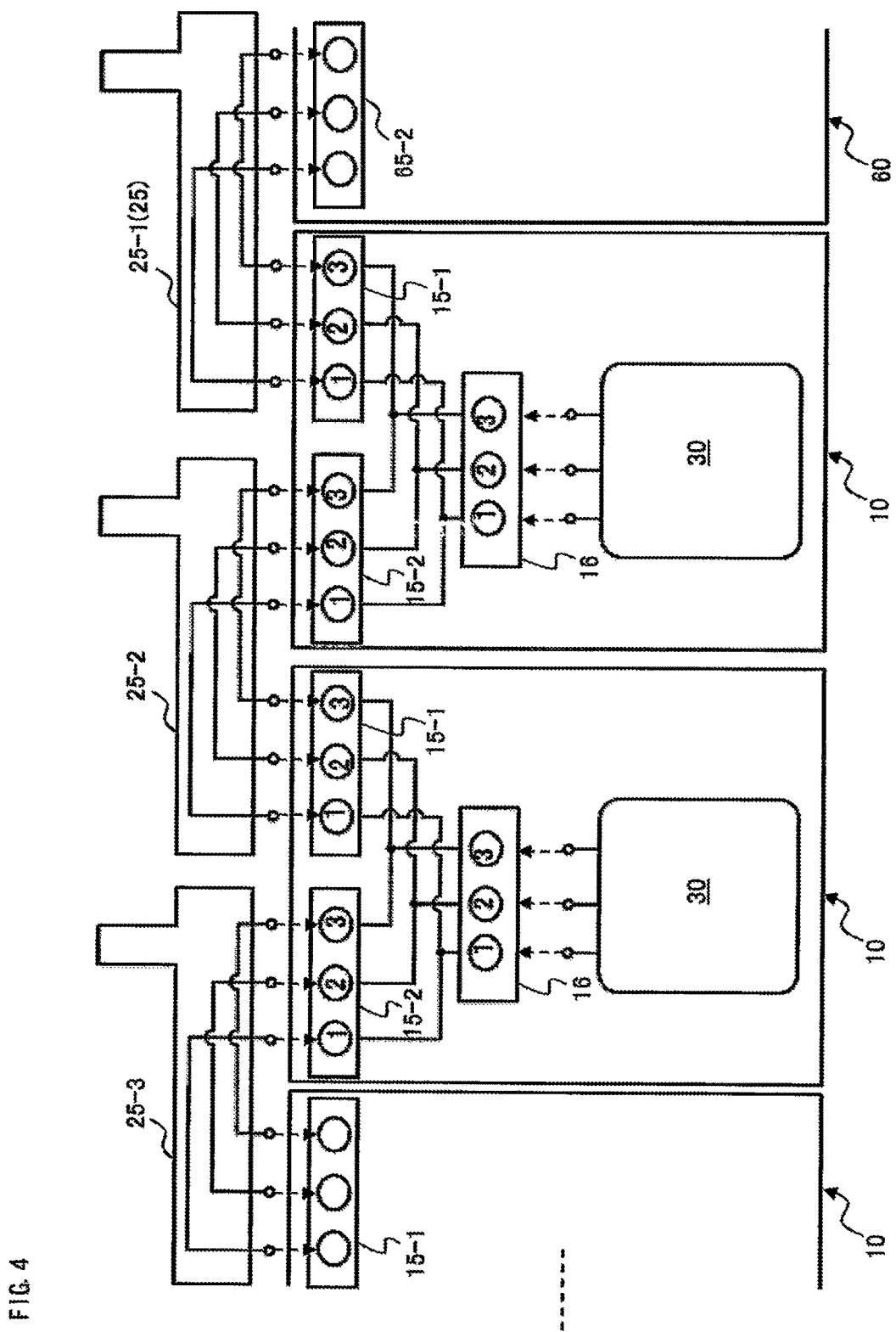
FIG. 4 is a schematic diagram illustrating a juncture image between an SPD side jack 10 and a power supply unit side jack 60 in FIG. 2.

FIG. 1 is a perspective view illustrating appearance of a surge protective system driven by an external power supply according to a first embodiment of the present invention. FIG. 2 is a perspective view illustrating the system in FIG. 1 in a separated manner. FIG. 3 is a schematic plan view of the system in FIG. 1. Further, FIG. 4 is a schematic diagram illustrating a juncture image between an SPD side jack 10 and a power supply unit side jack 60 in FIG. 2.

The surge protective system driven by the external power supply according to the first embodiment includes a plurality of SPDs 1 (for example, three SPDs 1-1, 1-2 and 1-3) for communication and one power supply unit 50, and these three SPDs 1 and one power supply unit 50 are fixed and installed together using a mounting rail for devices (for example, a DIN rail) 80. The DIN rail 80 is a device mounting fitting with, for example, a width of 35 mm defined in DIN standards. The DIN standards defines a mounting rail for devices for mounting electric equipment such as a switch and an industrial terminal block used with AC 1000 V or lower or DC 1500 V or lower. It should be noted that the number of SPDs 1 to be mounted is arbitrary according to the number of lines. Further, the three SPDs 1 and one power supply unit 50 may be directly fixed at a wooden board without using the DIN rail 80.

Each of the SPDs 1 (for example, three SPDs 1-1, 1-2 and 1-3) is connected between each of external line side lines 2 (for example, three external line side lines 2-1, 2-2 and 2-3) as an external line configured with a communication line or a control line and each of equipment side lines 3 (for example, three equipment side lines 3-1, 3-2 and 3-3) connected to equipment to be protected such as communication equipment and control equipment. Each SPD 1 has a protection function of protecting equipment to be protected against an abnormal voltage/abnormal current of lightning surge intruding from the external line side line 2 or the equipment side line 3, a display function of monitoring degradation as a result of the SPD 1 being repeatedly exposed to the lightning surge and displaying a degradation state of the SPD 1, and an output function of performing external output when replacement of the SPD is recommended. The power supply unit 50 is connected between an external power supply 5 and a contact output signal line 6, and has a function of supplying a power supply voltage (for example, DC 24 V) input from the external power supply 5 to each SPD 1 and transmitting information such as the degradation state of each SPD 1 and SPD replacement recommendation to the contact output signal line 6.

Each SPD 1 includes an SPD side jack 10 connected to the external line side line 2 and the equipment side line 3, and an SPD side plug 30 detachably attached by insertion to the jack 10.

The SPD side jack 10 which has a wiring function and an output function, includes a substantially U-shaped case 11. The substantially U-shaped case 11 has two facing erected parts of a first erected part and a second erected part which have a substantially rectangular cylindrical shape, and a coupling part which couples lower parts of these first erected part and second erected part. On the outer face side of the first erected part, two screw-shaped external line side terminals 12-1 and 12-2 connected to a pair of external line side lines 2, and a screw-shaped earth terminal 14-1 are provided at different levels. On the outer face side of the second erected part, two screw-shaped equipment side terminals 13-1 and 13-2 connected to a pair of equipment side lines 3, and a screw-shaped earth terminal 14-2 are provided at different levels. For example, the earth terminal 14-2 is grounded through a grounding conductor 4.

On an upper face of the coupling part, a juncture terminal 15-1 having three terminal parts 15-1(1), 15-1(2) and 15-1(3), a juncture terminal 15-2 having three terminal parts 15-2(1), 15-2(2) and 15-2(3) connected in parallel to the three terminal parts 15-1(1), 15-1(2) and 15-1(3), a first connection terminal 16 having three terminal parts 16(1), 16(2) and 16(3) connected in series with the terminal parts 15-1(1), 15-2(1), 15-1(2), 15-2(2), 15-1(3) and 15-2(3), a second connection terminal 17 configured with a jack side terminal block, and an erroneous insertion prevention hole 18 for preventing erroneous insertion of the SPD side plug 30 are disposed.

The SPD side plug 30 which has a protection function and a display function, includes a substantially rectangular parallelepiped case 31. The case 31 is detachably attached by insertion between the first erected part and the second erected part in the jack side case 11, and, on the upper face side, a display unit 45 and a push-button type switch 46 for display confirmation are disposed. The display unit 45 displays a degradation state, or the like, of a protection circuit provided within the case 31, and is configured with, for example, a green light emitting diode (hereinafter, this light emitting diode will be referred to as an "LED") 45a which displays a normal state, a yellow LED 45b which displays a replacement recommendation state, a red LED 45c which displays a degradation (failure) state, and an LED 45d for displaying a remaining battery level. It should be noted that because the surge protective system according to the first embodiment is driven by a power supply which utilizes the external power supply, and the LED 45d for displaying a remaining battery level and the switch 46 are not used, the LED 45d and the switch 46 are not electrically connected to other circuits.

The power supply unit 50 has the same outer shape as that of the SPD 1 while the power supply unit 50 has different internal circuits from those of the SPD 1. This power supply unit 50 includes a power supply unit side jack 60 connected to the external power supply 5 and the contact output signal line 6, and a power supply unit side plug 70 detachably attached by insertion to the jack 60.

The power supply unit side jack 60 which has a wiring function and an output function, includes a substantially U-shaped case 61. The substantially U-shaped case 61 has two facing erected parts of a first erected part and a second erected part which have a substantially rectangular cylindrical shape, and a coupling part which couples lower parts of these first erected part and second erected part. On the outer face side of the first erected part, a screw-shaped power supply terminal 62-1 connected at the ground side of the external power supply 5, a screw-shaped power supply terminal 62-2 connected to a positive side (for example, +24 V) of the external power supply 5, and a screw-shaped earth terminal 64-1 are provided at different levels. On the outer face side of the second erected part, two screw-shaped output terminals 63-1 and 63-2 connected to a pair of contact output signal lines 6, and a screw-shaped earth terminal 64-2 are provided at different levels. For example, the earth terminal 64-2 is grounded through a grounding line 4.

On an upper face of the coupling part, as with the SPD side coupling part, a juncture terminal 65-1 having three terminal parts 65-1(1), 65-1(2) and 65-1(3), a juncture terminal 65-2 having three terminal parts 65-2(1), 65-2(2) and 65-2(3) connected in parallel to the tree terminal parts 65-1(1), 65-1(2) and 65-1(3), a first connection terminal having three terminal parts connected in series with the terminal parts 65-1(1), 65-2(1), 65-1(2), 65-2(2), 65-1(3) and 65-2(3), a second connection terminal configured with a jack side terminal block, and an erroneous insertion prevention hole for preventing erroneous insertion of an SPD side plug 70 are disposed.

The power supply unit side plug 70 which has a contact output switching function, includes a substantially rectangular parallelepiped case 71. The case 71 is detachably attached by insertion between the first erected part and the second erected part in the jack side case 61, and, on an upper face side, a display unit and a switch for dummy are disposed as with the SPD side plug 30.

The three SPD side jacks 10 and one power supply unit side jack 60 which are installed together are detachably connected using three juncture plugs 25 (that is, a first juncture plug 25-1, a second juncture plug 25-2 and a third juncture plug 25-3).

As illustrated in FIG. 4, the juncture terminal 65-2 on the power supply unit 50 side and the juncture terminal 15-1 on the SPD 1-1 side are connected using the first juncture plug 25-1, the juncture terminal 15-2 on the SPD 1-1 side and the juncture terminal 15-1 on the SPD 1-2 side are connected using the second juncture plug 25-2, and, further, the juncture terminal 15-2 on the SPD 1-2 side and the juncture terminal 15-1 on the SPD 1-3 side are connected using the third juncture plug 25-3.

Figure 7:
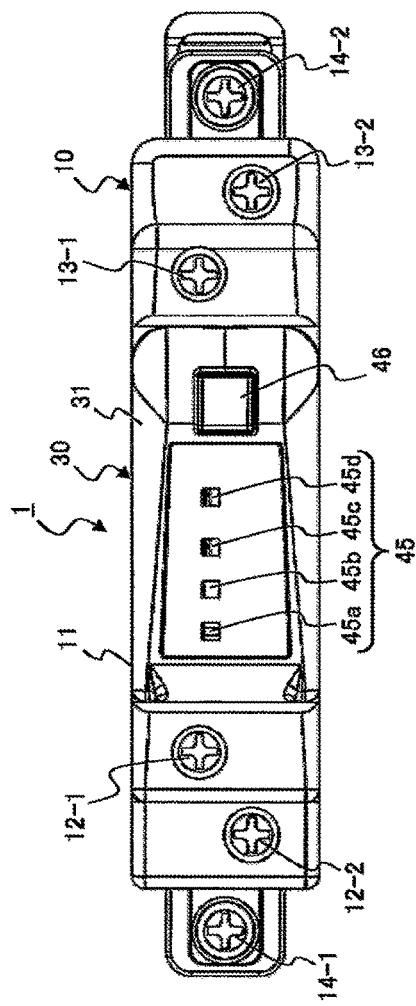
FIG. 7 is a plan view of the SPD 1 in FIG. 1.
Figure 8:
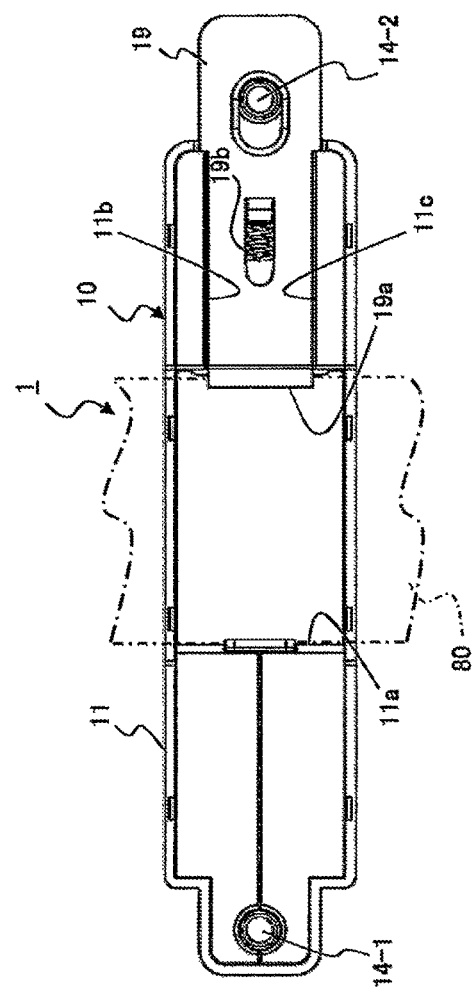
FIG. 8 is a bottom view of the SPD 1 in FIG. 1.

FIG. 5 is a left side view of the SPD 1 in FIG. 1, FIG. 6 is a right side view of the SPD 1 in FIG. 1, FIG. 7 is a plan view of the SPD 1 in FIG. 1, and FIG. 8 is a bottom view of the SPD 1 in FIG. 1.

In the case 11 on the jack 10 side, at a lower part of the external line side terminal 12-1 on the left side face, a rectangular line introduction hole 12-1a is formed, and, also at a lower part of the external line side terminal 12-2 on the left side face, a rectangular line introduction hole 12-2a is formed. At a lower part of the equipment side terminal 13-1 on the right side face, a rectangular line introduction hole 13-1a is formed, and also at a lower part of the equipment side terminal 13-2 on the right side face, a rectangular line introduction hole 13-2a is formed. On a bottom face of the case 11, a latching claw 11a for latching a lateral face of the DIN rail 80 is formed. At a position distant from the latching claw 11a, a pair of guide rails 11b and 11c having reverse L-shaped cross sections are formed in parallel. A rectangular plate-like rail stopper 19 is slidably attached to the guide rails 11b and 11c. At a tip of the rail stopper 19, a latching claw 19a is formed, and this latching claw 19a is biased by a coil spring 19b in a direction of the latching claw 11a which faces the latching claw 19a. The bottom face of the case 11 is detachably fixed in a state where the latching claw 11a and the latching claw 19a which face each other hold the both side faces of the DIN rail 80 therebetween.

Figure 10A:
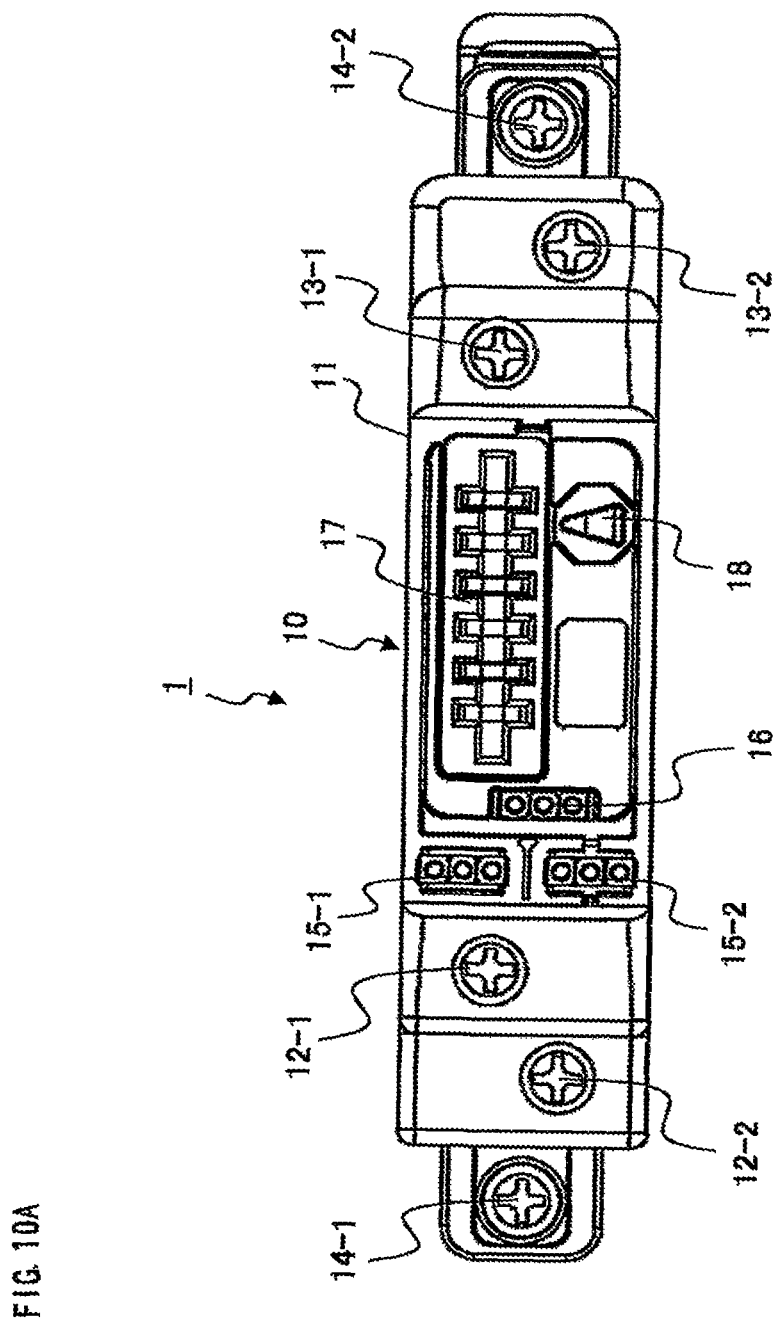
FIG. 10A is a plan view of the SPD side jack 10 in FIG. 2.
Figure 10B:
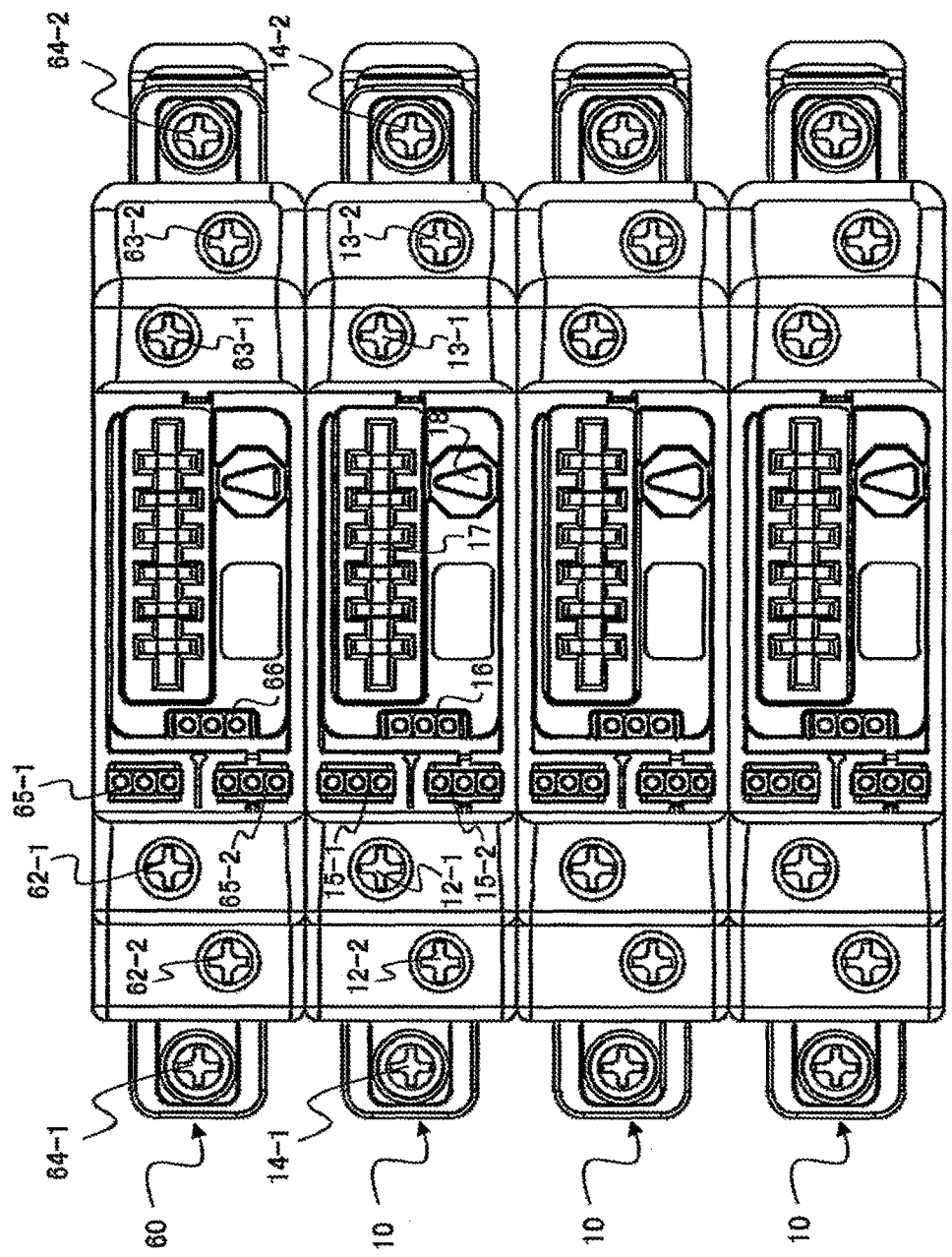
FIG. 10B is a plan view illustrating a juncture state between the SPD side jack 10 and the power supply unit side jack 60 in FIG. 2.
Figure 10C:
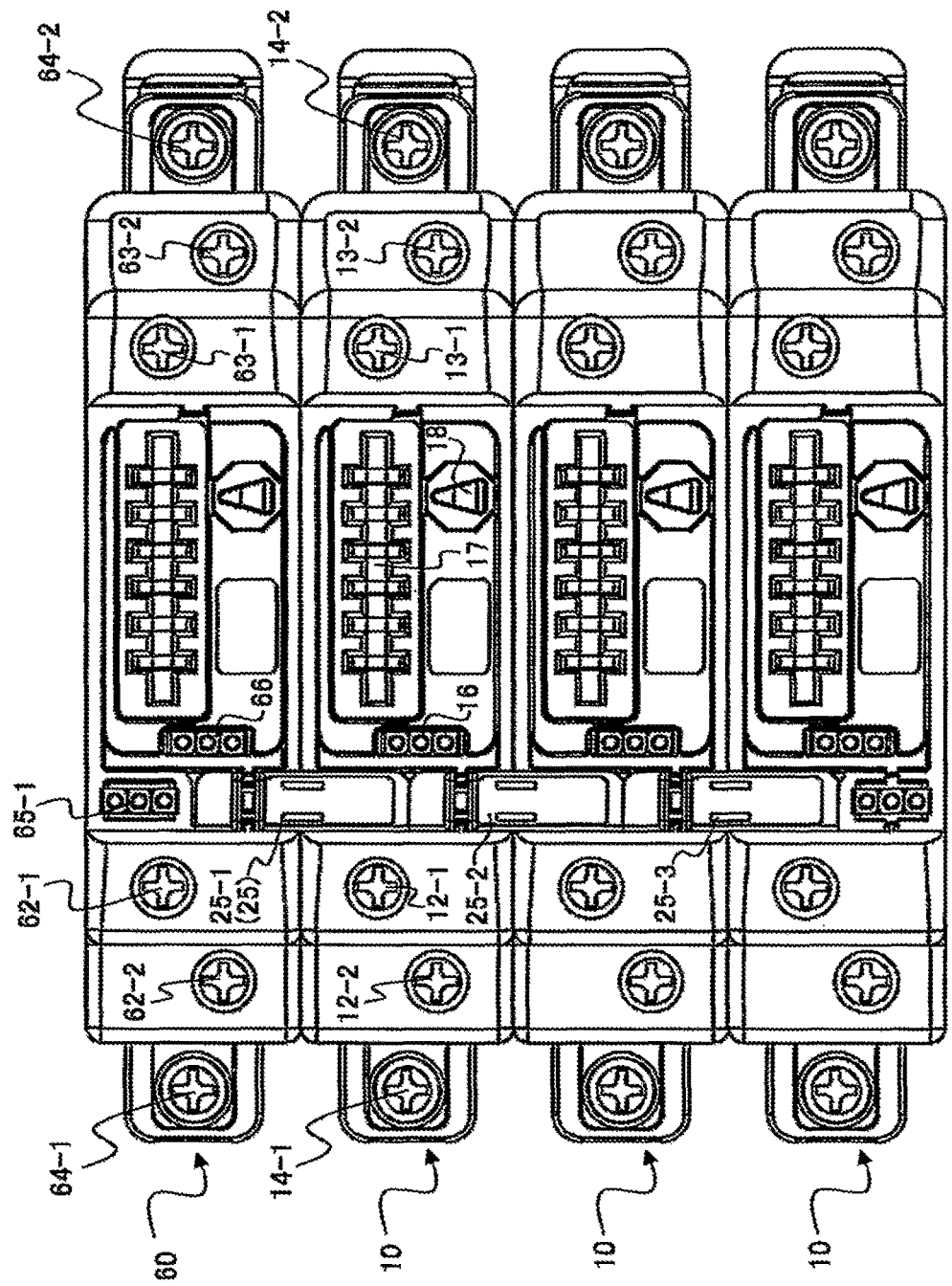
FIG. 10C is a plan view illustrating a state where the juncture plug 25 is loaded to the jacks 10 and 60 in FIG. 10B.
Figure 11:
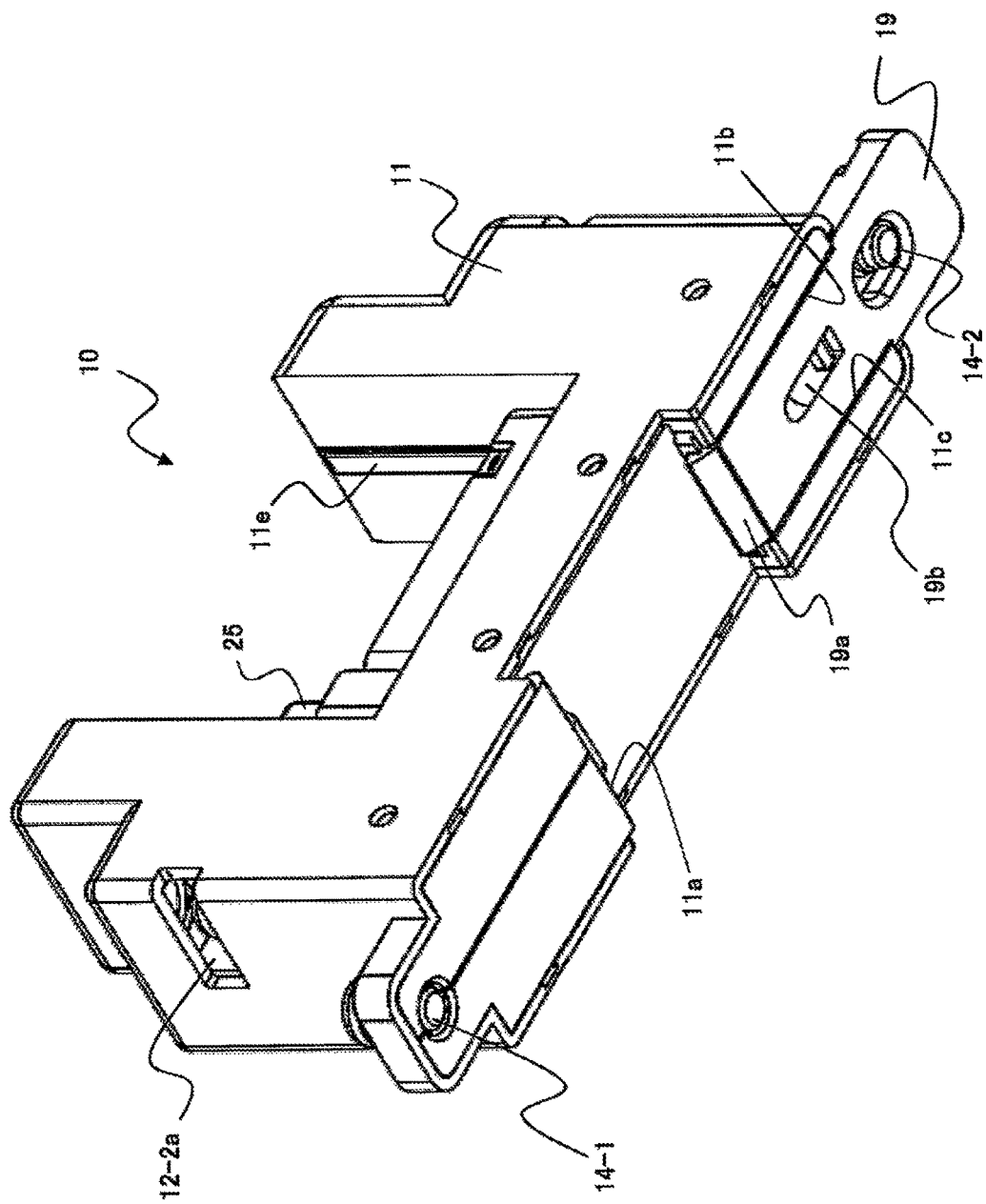
FIG. 11 is a perspective view of a bottom face side in FIG. 9.

FIG. 9 is a perspective view illustrating a state where the juncture plug 25 is loaded to the SPD side jack 10 in FIG. 2. FIG. 10A is a plan view of the SPD side jack 10 in FIG. 2. FIG. 10B is a plan view illustrating a juncture state between the SPD side jack 10 and the power supply unit side jack 60 in FIG. 2. FIG. 10C is a plan view illustrating a state where the three juncture plugs 25 (that is, juncture plugs 25-1, 25-2 and 25-3) are loaded to the two jacks 10 and 60 in FIG. 10B. Further, FIG. 11 is a perspective view of a bottom face side of FIG. 9.

In the case 11 of the SPD side jack 10, on an inner side face of the first erected part and the second erected part which face each other, to guide insertion and detachment of the SPD side plug 30, guide convex parts 11d and 11e extending in a longitudinal direction are provided so as to project.

As illustrated in FIG. 9 and FIG. 10A, when the SPD side jack 10 is not connected, the two juncture terminals 15-1 and 15-2 of the SPD side jack 10 are connected to each other using the juncture plug 25. As illustrated in FIG. 10B and FIG. 10C, when the three SPD side jacks 10 and one power supply unit side jack 60 are connected, the juncture terminal 65-2 on the power supply unit 50 side and the juncture terminal 15-1 on the SPD 1-1 side are connected using the first juncture plug 25-1, the juncture terminal 15-2 on the SPD 1-1 side and the juncture terminal 15-1 on the SPD 1-2 side are connected using the second juncture plug 25-2, and the juncture terminal 15-2 on the SPD 1-2 side and the juncture terminal 15-1 on the SPD 1-3 side are connected using the third juncture plug 25-3.

Figure 12:
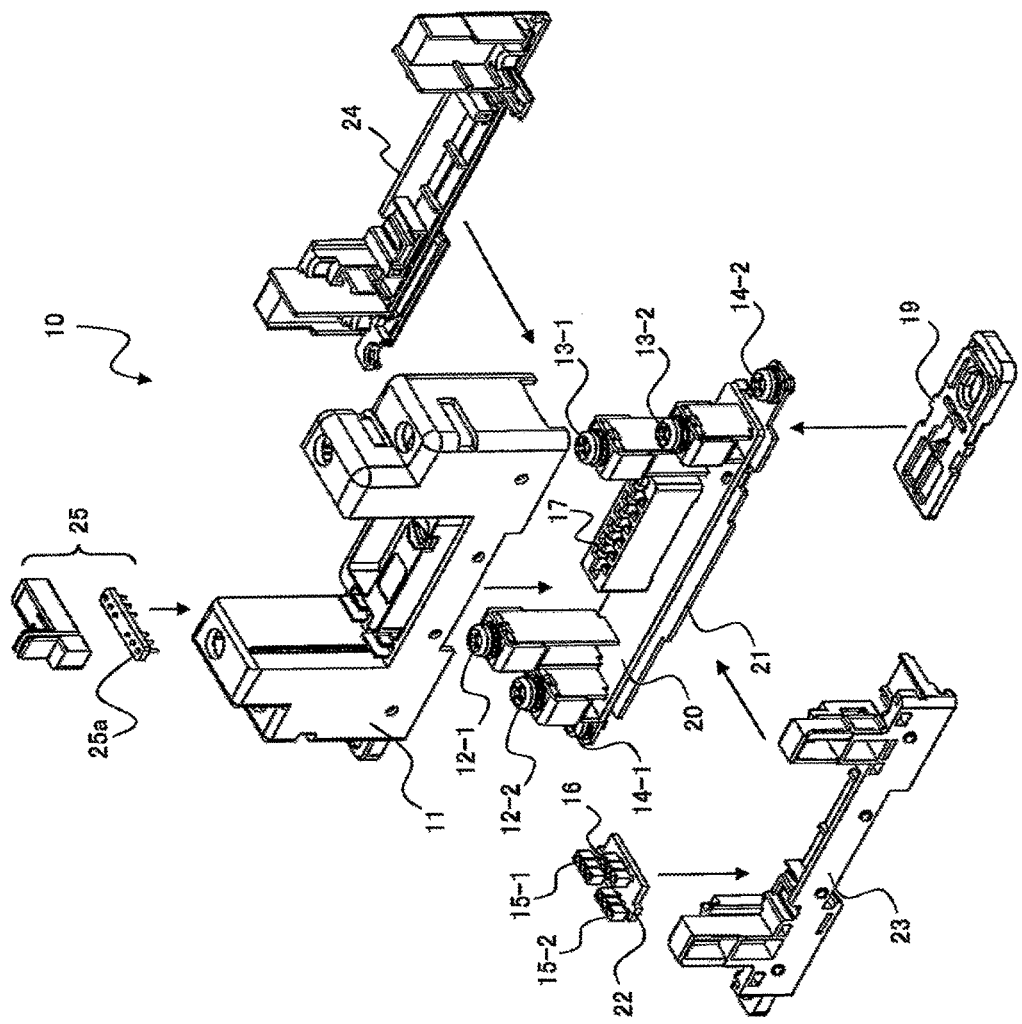
FIG. 12 is a schematic exploded perspective view illustrating the SPD side jack 10 in FIG. 9.

FIG. 12 is a schematic exploded perspective view illustrating the SPD side jack 10 in FIG. 9.

The SPD side jack 10 has a rectangular plate-like jack substrate 20 and a rectangular plate-like earth fitting 21. Around both ends on the jack substrate 20, the external line side terminals 12-1 and 12-2 and the equipment side terminals 13-1 and 13-2 are separately attached, and between the external line side terminals 12-1 and 12-2 and the equipment side terminals 13-1 and 13-2, a second connection terminal 17 configured with a card edge connector is attached. At both ends of the earth fitting 21, the two earth terminals 14-1 and 14-2 are separately attached, and the earth fitting 21 is connected to a bottom face side of the jack substrate 20.

The juncture terminals 15-1 and 15-2 and the first connection terminal 16 are respectively configured with a jack having a female contact, and attached on a coupling substrate 22. The coupling substrate 22 is loaded to an inner case 23. On both sides of the jack substrate 20 to which the earth fitting 21 is connected, two inner cases 23 and 24 are loaded so as to face each other, and on the bottom face of the earth fitting 21, the rail stopper 19 is slidably attached through the coil spring 19b. The jack substrate 20 and the earth fitting 21 on which these inner cases 23 and 24 and the rail stopper 19 are attached are fixed by being inserted from the bottom face side of the external case 11, so that the SPD side jack 10 is assembled. The juncture plug 25 attached by insertion to the juncture terminals 15-1 and 15-2 has six male contacts 25a.

Figure 13:
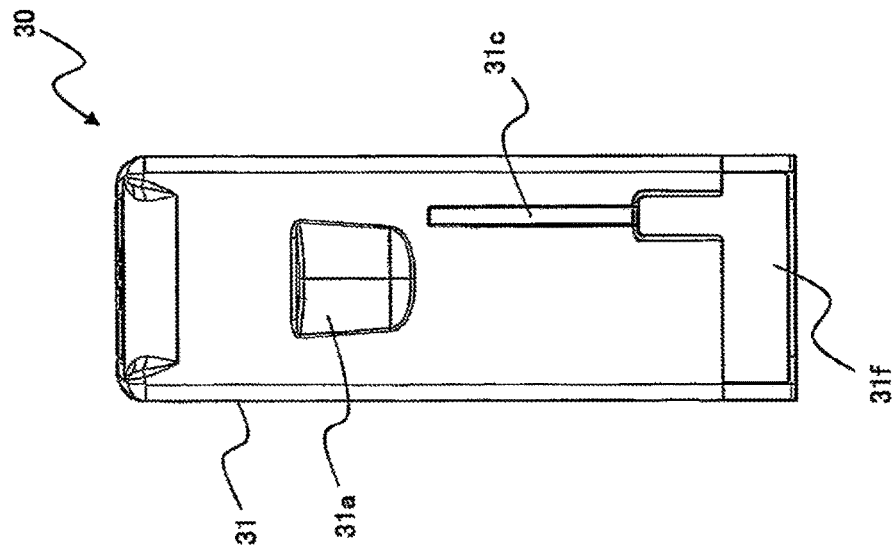
FIG. 13 is a left side view of an SPD side plug 30 in FIG. 2.

FIG. 13 is a left side view of the SPD side plug 30 in FIG. 2.

In the case 31 of the SPD side plug 30, at a central upper part on the left side face, a substantially rectangular concave part 31a for tab is formed. At a lower and right part of the concave part 31a for tab, a guide concave part 31c extending in a longitudinal direction for accepting and guiding the guide convex part 11d of the SPD side jack 10 is formed. At a lower part on the left side face of the case 31, juncture plug storage space 31f having a substantially square cross section is formed.

Meanwhile, in the case 31 of the SPD side plug 30 illustrated in FIG. 2, at a central upper part on the right side face, a substantially rectangular concave part 31b for tab is formed. From a lower central part to a lower part of the concave part 31b for tab, a guide concave part 31d extending in a longitudinal direction for accepting and guiding the guide convex part 11e of the SPD side jack 10 is formed. Around the guide concave part 31d, a U-shaped cutout groove 31e for providing elasticity to this surrounding area is formed.

Figure 14:
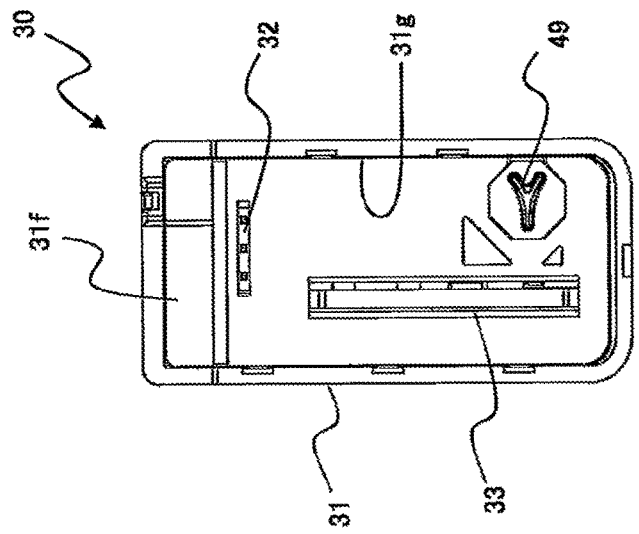
FIG. 14 is a bottom view of the SPD side plug 30 in FIG. 2.

FIG. 14 is a bottom view of the SPD side plug 30 in FIG. 2.

On a bottom face of the case 31 of the SPD side plug 30, at an inner side of an outer edge, a storage concave part 31g is formed. At an inner side of the storage concave part 31g, a third connection terminal 32 formed with three juncture pins is provided so as to project closer to the juncture plug storage space 31f. In a direction orthogonal to the third connection terminal 32, a fourth connection terminal 33 formed with a plate-like card edge terminal for being inserted into the second connection terminal 17 of the SPD side jack 10 is provided so as to project. Further, in the vicinity of the fourth connection terminal 33, an erroneous insertion prevention plug 49 for being inserted into the erroneous insertion prevention hole 18 of the SPD side jack 10 is provided so as to project.

Figure 15:
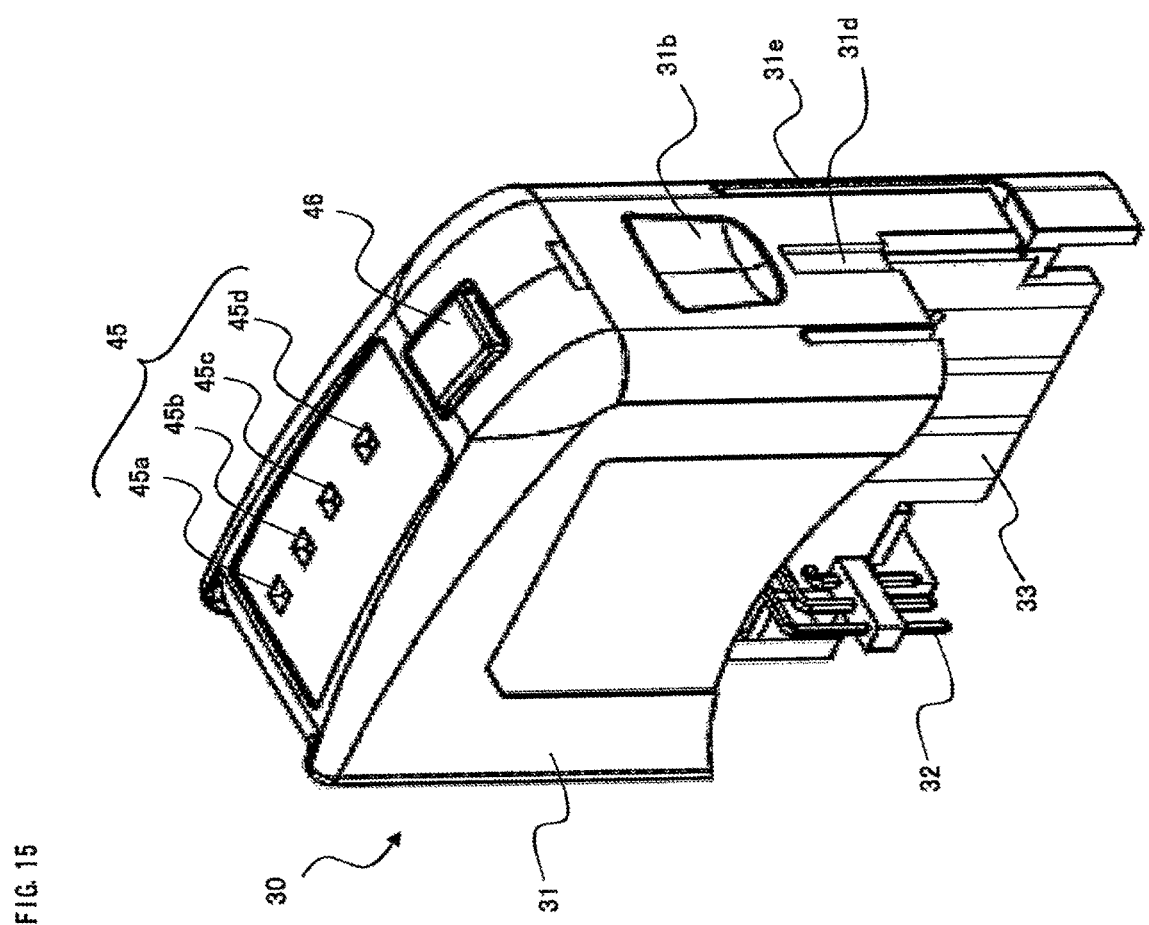
FIG. 15 is a partially cutout perspective view of the SPD side plug 30 in FIG. 2.
Figure 16:
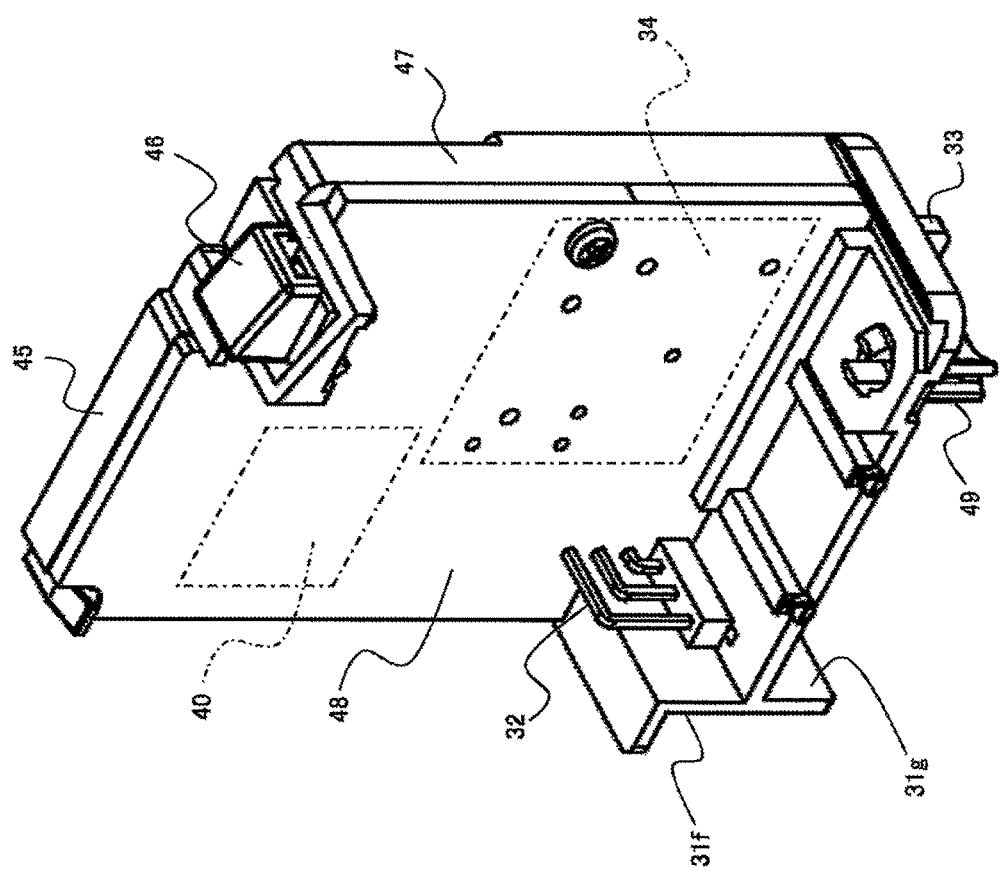
FIG. 16 is a perspective view of an internal structure in which internal parts of the SPD side plug 30 in FIG. 2 are omitted.

FIG. 15 is a partially cutout perspective view of the SPD side plug 30 in FIG. 2, and FIG. 16 is a perspective view of an internal structure in which inner parts of the SPD side plug 30 in FIG. 2 are omitted.

Within the case 31 of the SPD side plug 30, an inner frame 47 having a substantially L-shaped cross section is stored. At an end portion of an upper part of the inner frame 47, the switch 46 is attached. In a longitudinal direction of the inner frame 47, a plug substrate 48 for wiring is fixed using a screw. At an upper part of the plug substrate 48, the switch 46, and the four LEDs 45a, 45b, 45c and 45d configuring the display unit 45 are provided. At an upper part of the plug substrate 48, a degradation detecting unit 40 is mounted, and, further, below the degradation detecting unit 40, a protection circuit 34 is mounted.

The protection circuit 34 is a circuit which discharges lightning surge intruding from the external line side terminals 12-1 and 12-2 of the SPD side jack 10 or the equipment side terminals 13-1 and 13-2 through the second connection terminal 17 and the fourth connection terminal 33 of the SPD side plug 30 to the earth terminal 14-2 side to protect the equipment to be protected. Further, the degradation detecting unit 40 detects intrusion of the lightning surge and detects a degradation state of the protection circuit 34 by comparing a history of the lightning surge (such as, for example, a degree of the lightning surge and the number of times of intrusion of the lightning surge) with a reference value.

At a lower part of the plug substrate 48, the third connection terminal 32 and the fourth connection terminal 33 are connected while piercing through a bottom of the inner frame 47. At the bottom of the inner frame 47, juncture plug storage space 31f and a storage concave part 31g are formed, and the third connection terminal 32, the fourth connection terminal 33 and the erroneous insertion prevention plug 49 are provided within the storage concave part 31g so as to project.

Figure 17:
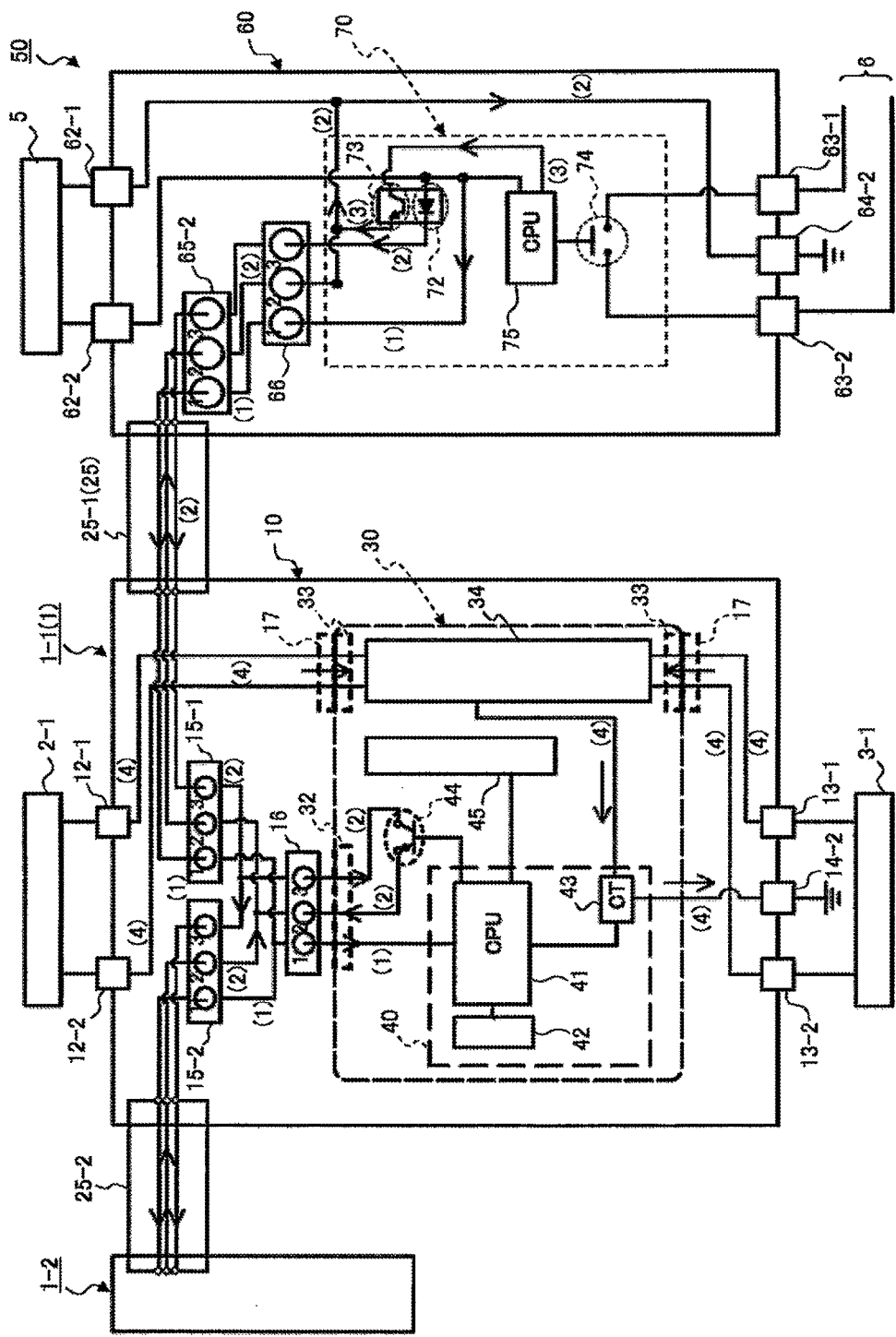
FIG. 17 is a schematic circuit diagram illustrating a configuration of the surge protective system according to the first embodiment of the present invention.

FIG. 17 is a schematic circuit diagram illustrating a configuration of the surge protective system in FIG. 1 according to the first embodiment of the present invention. FIG. 17 illustrates a juncture state of the two SPDs 1-1 and 1-2 out of the three SPDs 1-1, 1-2 and 1-3 and one power supply unit 50.

Each of the SPDs 1-1, 1-2 and 1-3 has the same circuit configuration. The SPD 1-1 includes the SPD side jack 10, and the SPD side plug 30 detachably attached by insertion to the SPD side jack 10.

The SPD side jack 10 has the case 11, and the two external line side terminals 12-1 and 12-2, the two equipment side terminals 13-1 and 13-2, the two earth terminals 14-1 and 14-2, the two juncture terminals 15-1 and 15-2, one first connection terminal 16 and one second connection terminal 17 are attached to this case 11. The juncture terminal 15-1 has the three terminal parts 15-1(1), 15-1(2) and 15-1(3). In a similar manner, the juncture terminal 15-2 has the three terminal parts 15-2(1), 15-2(2) and 15-2(3), and the first connection terminal 16 has the three terminal parts 16(1), 16(2) and 16(3). The terminal parts 15-1(1), 15-1(2) and 15-1(3) of the juncture terminal 15-1, the terminal parts 15-2(1), 15-2(2) and 15-2(3) of the juncture terminal 15-2, and the terminal parts 16(1), 16(2) and 16(3) of the first connection terminal 16 are connected in parallel. The pair of external line side lines 2-1 is connected to the two external line side terminals 12-1 and 12-2. The pair of equipment side lines 3-1 is connected to the two equipment side terminals 13-1 and 13-2. Out of the two earth terminals 14-1 and 14-2, for example, one earth terminal 14-2 is grounded.

The SPD side plug 30 has the case 31, and one third connection terminal 32 and one fourth connection terminal 33 are attached to this case 31. The third connection terminal 32 is detachably connected to the jack side first connection terminal 16. The fourth connection terminal 33 is detachably connected to the jack side second connection terminal 17. Within the case 31, the protection circuit 34, the degradation detecting unit 40, switching means (for example, a transistor) 44, the display unit 45, or the like, are provided.

The protection circuit 34 is a circuit which is connected to the fourth connection terminal 33 and the earth terminal 14-2, and which discharges lightning surge intruding from the external line side terminals 12-1 and 12-2 or the equipment side terminals 13-1 and 13-2 through the second connection terminal 17 and the fourth connection terminal 33 to the earth terminal 14-2 side to protect the equipment to be protected. This protection circuit 34 is configured with a lightning protection element such as an arrester which is a lightning protection tube and a varistor which is a non-linear resistive element. The lightning protection element loses its protection function when the element degrades as the number of times of operation, or the like, by lightning surge increases. Therefore, the degradation detecting unit 40 for detecting a degradation state of the lightning protection element is provided.

The degradation detecting unit 40 detects a lightning surge current flowing between the protection circuit 34 and the earth terminal 14-2 and detects the degradation state of the protection circuit 34 by comparing a history of this lightning surge (such as, for example, a degree of the lightning surge and the number of times of intrusion of the lightning surge) with a reference value. This degradation detecting unit 40 has a control circuit (for example, a central processing unit, hereinafter, referred to as a "CPU") 41 having an operation/control function, a memory 42 which is accessed by this CPU 41 and in which the history, or the like, of the lightning surge is stored, detecting means (for example, a current transformer, hereinafter, referred to as a "CT") 43 which detects lightning surge flowing from the protection circuit 34 to the earth terminal 14-2 side and provides this detection signal to the CPU 41, or the like.

The transistor 44 is connected between the two terminal parts 16(2) and 16(3) of the jack side first connection terminal 16 through the third connection terminal 32, put into an on state by a control signal of the CPU 41, and has a function of making the two terminal parts 16(2) and 16(3) conductive.

The display unit 45 is connected to the CPU 41 within the degradation detecting unit 40 and displays a detection result, or the like, of the degradation detecting unit 40, and is configured with, for example, the green LED 45a which displays a normal state, the yellow LED 45b which displays a replacement recommendation state, the red LED 45c which displays a degradation (failure) state and the LED 45d for displaying a remaining battery level. It should be noted that because the LED 45d for displaying the remaining battery level and the switch 46 disposed in the vicinity of the display unit 45 illustrated in FIG. 2 are not used in the first embodiment, the LED 45d and the switch 46 are not connected to the CPU 41.

The power supply unit 50 has the same outer shape as that of the SPD 1-1, and includes the power supply unit side jack 60, and the power supply unit side plug 70 which is detachably attached by insertion to this power supply unit side jack 60.

The power supply unit side jack 60 has a case, and terminals such as two power supply terminals 62-1 and 62-2, two contact output terminals 63-1 and 63-2, two earth terminals 64-1 and 64-2, two juncture terminals 65-1 and 65-2 and one first connection terminal 66 are attached to this case. While the juncture terminal 65-1 has three terminal parts, because the terminal parts are not used in the first embodiment, the terminal parts are not connected to other terminals. The juncture terminal 65-2 has the three terminal parts 65-2(1), 65-2(2) and 65-2(3). In a similar manner, the first connection terminal 66 has three terminal parts 66(1), 66(2) and 66(3). The terminal parts 65-2(1), 65-2(2) and 65-2(3) of the juncture terminal 65-2 and the terminal parts 66(1), 66(2) and 66(3) of the first connection terminal 66 are connected in series. The power supply terminal 62-1 is connected to a 0-V terminal of the external power supply 5, and the power supply terminal 62-2 is connected to +24-V terminal of the external power supply 5. The pair of contact output signal lines 6 is connected to the two contact output terminals 63-1 and 63-2. For example, the earth terminal 64-2 is connected to the power supply terminal 62-1 and grounded.

The power supply unit side plug 70 has a case, and is detachably connected to the power supply terminals 62-1 and 62-2 of the power supply unit side jack 60, the first connection terminal 66, the contact output terminals 63-1 and 63-2 and the earth terminal 64-2 through the terminals attached to this case. Inside the case of the power supply unit side plug 70, a control circuit (for example, a CPU) 75, switching means (for example, a light emitting diode 72, a phototransistor 73 and a relay 74) which performs on/off operation by control of this CPU 75, or the like, are provided.

The CPU 75 is driven with +24 V supplied from the power supply terminal 62-2. The CPU 75 is connected to the terminal part 66(1) of the first connection terminal 66 and connected to the terminal part 66(3) of the first connection terminal 66 through the light emitting diode 72. The CPU 75 is connected to the terminal part 66(2) of the first connection terminal 66 and the power supply terminal 62-1 through the phototransistor 73 which is put into an on state by light emission of the light emitting diode 72.

The juncture terminal 15-1 on the SPD 1-1 side and the juncture terminal 65-2 on the power supply unit 50 side are detachably connected by the juncture plug 25-1. As illustrated in FIG. 4, the juncture terminal 15-2 on the SPD 1-1 side and the juncture terminal 15-1 on the adjacent SPD 1-2 side are detachably connected with the juncture plug 25-2. In a similar manner, the SPD 1-2 and the adjacent SPD 1-3 are detachably connected with the juncture plug 25-3.

(Operation of First Embodiment) As illustrated in FIG. 1 and FIG. 3, (I) operation step 1 and (II) operation step 2 in the case where the SPDs 1-1, 1-2 and 1-3 perform protection operation against lightning surge in a state where the three SPDs 1-1, 1-2 and 1-3 and one power supply unit 50 are connected, will be described with reference to FIG. 1, or the like.

(I) Operation Step 1

For example, when an excessive lightning surge voltage occurs between the external line side line 2-1 or the equipment side line 3-1 and the earth terminal 14-2, the protection circuit 34 within the SPD side plug 1-1 operates, and a surge current is discharged through a surge current pathway as indicated with the following arrow (4):

"External line side terminals 12-1 and 12-2 or the equipment side terminals 13-1 and 13-2→protection circuit 34→earth terminal 14-2"

When the surge current is discharged to the earth terminal 14-2, data of the surge current detected at the CT 43 is stored in the memory 42 through the CPU 41. The CPU 41 determines a state of the SPD 1-1 (that is, a state of the protection circuit 34) by comparing the history of the lightning surge (such as, for example, a degree of the surge current and the number of times of intrusion) stored in the memory 42 with a reference value set in advance, and turns on any one of the green LED 45a, the yellow LED 45b and the red LED 45c at the display unit 45 according to the determination result.

When, for example, it is determined that the SPD 1-1 is recommended to be replaced or degrades, the CPU 41 puts the transistor 44 into an on state using a control signal. When the transistor 44 is put into an on state, the terminal part (3) and the terminal part (2) of the first connection terminal 16 become conductive, and a power supply current flows through a current pathway for light emitting diode operation as indicated with the following arrow (2):

"Power supply terminal 62-2 of +24 V of power supply unit 50→light emitting diode 72→terminal part (3) of first connection terminal 66→terminal part (3) of juncture terminal 65-2→juncture plug 25-1→terminal part (3) of juncture terminal 15-1 of SPD 1-1→terminal part (3) of first connection terminal 16→transistor 44→terminal part (2) of first connection terminal 16→terminal part (2) of juncture terminal 15-1→juncture plug 25-1→terminal part (2) of juncture terminal 65-2 of power supply unit 50→terminal part (2) of first connection terminal 66→earth terminal 64-2"

(II) Operation Step 2

When the power supply current flows to the light emitting diode 72 through the current pathway for light emitting diode operation indicated with the arrow (2), this light emitting diode 72 emits light. When the light emitting diode 72 emits light, the phototransistor 73 is put into an on state, and a current flows from the CPU 75 to the earth terminal 64-2 through the phototransistor 73 through a current pathway for relay operation indicated with an arrow (3). By this means, the CPU 75 detects that any of the adjacent SPDs 1-1, 1-2 and 1-3 is recommended to be replaced or is put into a degradation state (that is, recognizes change of a state of a port) and makes the relay 74 operate. When the relay 74 operates, a circuit of the contact output part configured with the contact output terminals 63-1 and 63-2 becomes conductive, and the above-described detection result of replacement recommendation or the degradation state is contact output to a distance through the contact output signal line 6.

It should be noted that the power supply unit 50 and circuits of the three SPDs 1-1, 1-2 and 1-3 adjacent to the power supply unit 50 are connected in parallel. Therefore, the above-described operation of the operation step 1 of (I) is performed between the power supply unit 50 and each of the SPDs 1-1, 1-2 and 1-3 adjacent to the power supply unit 50, and, when it is determined that even one of the SPDs 1 is recommended to be replaced or degrades, a circuit which is the same as the current pathway for light emitting diode operation indicated with the above-described arrow (2), and which is built between the power supply unit 50 and the SPD 1 for which the problem is detected, operates, and the detection result of replacement recommendation or degradation determination is contact output to the contact output signal line 6.

(Advantageous Effects of First Embodiment)

According to the SPD 1 and the surge protective system of the first embodiment, because the power/communication line constructed using cables can be connected only through attachment of the juncture terminals 15-1, 15-2 and 65-2 and the plurality of juncture plugs 25 (for example, three juncture plugs 25-1, 25-2 and 25-3), the following advantageous effects of (i) to (iv) can be obtained.

(i) Because cables are not used in the power/communication line of the SPD 1, it is possible to save troubles for wiring.

(ii) Because it is not necessary to extend a cable of the power/communication line when an SPD 1 is annexed, the SPD 1 can be easily annexed.

(iii) As a result of work for installing the SPD 1 being simplified, workability is improved.

(iv) Because troubles for laying operation in the power/communication line is reduced, it is possible to easily attach the SPD 1 having a function of "replacement recommendation display" and "contact output to a distance" at a location where there are several tens to several hundred lines in a communication system, or the like.

Second Embodiment (Configuration of Second Embodiment)

Figure 18:
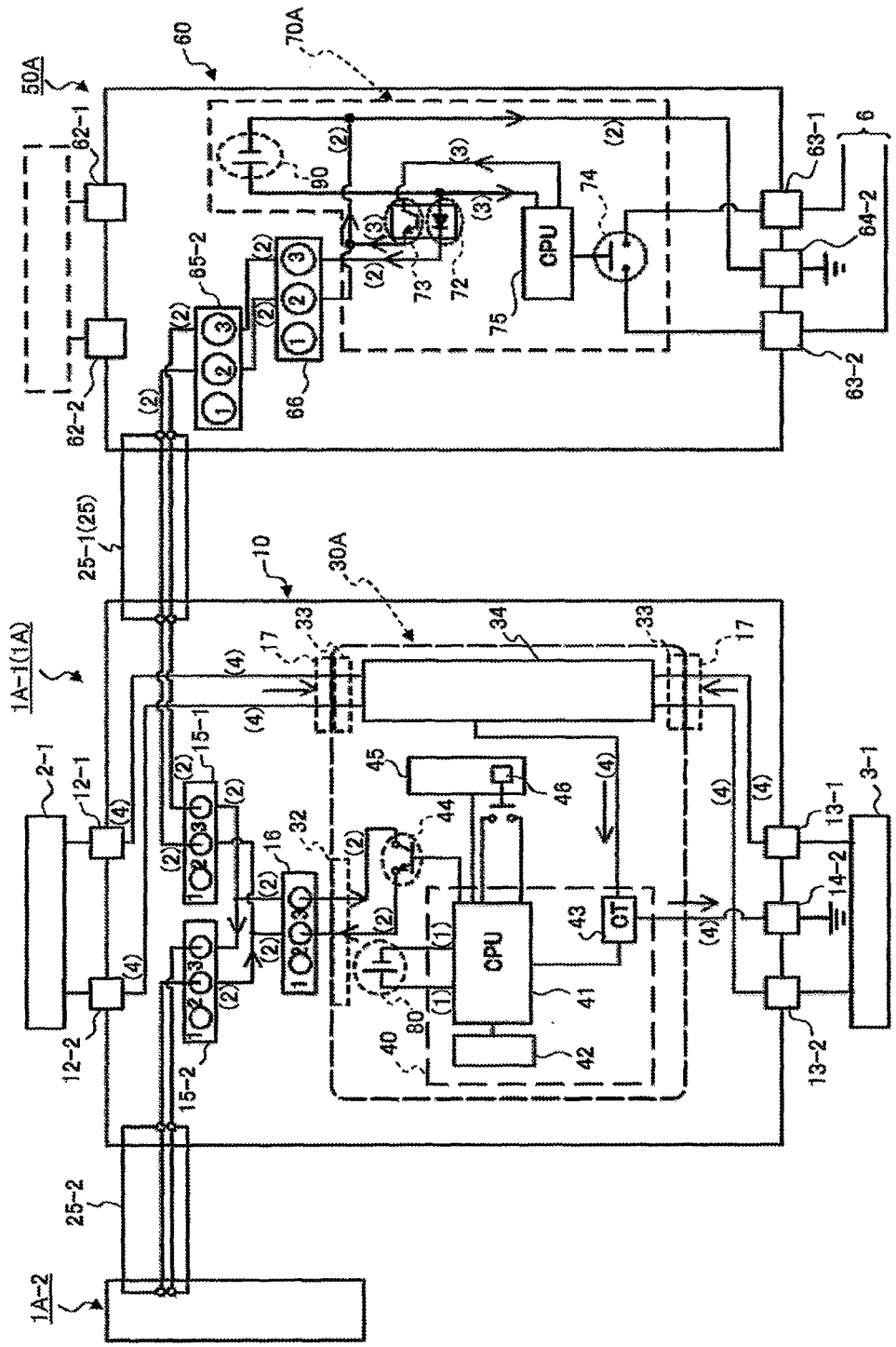
FIG. 18 is a schematic circuit diagram illustrating a surge protective system driven by a battery according to a second embodiment of the present invention.

FIG. 18 is a schematic circuit diagram illustrating a configuration of a surge protective system driven by a battery according to a second embodiment of the present invention, and common reference numerals are assigned to components common to those in FIG. 17 which illustrates the surge protective system driven by the external power supply in the first embodiment.

The surge protective system driven by a battery according to the second embodiment is configured to be driven by batteries 80 and 90 in place of the external power supply 5.

The surge protective system according to the second embodiment includes a plurality of SPDs 1A (for example, SPDs 1A-1, 1A-2, . . . ) in each of which the battery 80 is incorporated, and a power supply unit 50A in which the battery 90 is incorporated, and these are connected to each other with a plurality of juncture plugs 25 (for example, juncture plugs 25-1, 25-2, . . . ).

Each of the SPDs 1A (for example, SPDs 1A-1, 1A-2, . . . ) includes an SPD side jack 10 and an SPD side plug 30A in which the battery 80 is incorporated and which is detachably attached by insertion to the SPD side jack 10 as with the first embodiment.

While the SPD side jack 10 has the same configuration as that of the first embodiment, wire is connected such that the terminal parts 15-1(1), 15-2(1) and 16(1) for supplying power are not used in terminals such as the juncture terminals 15-1 and 15-2 and the first connection terminal 16, and only the terminal parts 15-1(2), 15-2(2) and 16(2) and the terminal parts 15-1(3), 15-2(3) and 16(3) are used.

While the SPD side plug 30A has a case 31 which is the same as that in the first embodiment, the battery 80 (for example, DC 3 V) is stored within this case 31. The battery 80 is detachably attached by insertion by a battery cover which is provided on a side wall of the case 31 and which is not illustrated being open and closed. By this battery 80, the CPU 41 is driven. The switch 46 for display confirmation is connected to the CPU 41 to reduce power consumption, and, when this switch 46 is depressed, the LED 45d for displaying a remaining battery level within the display unit 45 becomes conductive. Further, after the switch 46 is depressed, for example, any one of the green LED 45a which displays a normal state, the yellow LED 45b which displays a replacement recommendation state and the red LED 45c which displays a degradation (failure) state is turned on for approximately one second. Other configuration of the SPD side plug 30A is the same as that of the plug 30 in the first embodiment.

The power supply unit 50A includes the power supply unit side jack 60 and a power supply unit side plug 70A in which the battery 90 is incorporated and which is detachably attached by insertion to the power supply unit side jack 60 as with the first embodiment.

While the power supply unit side jack 60 has the same configuration as that of the first embodiment, because the external power supply 5 is not used, the external line side terminals 62-1 and 62-2 are not connected to the external power supply 5. Further, wire is connected such that the terminal parts 65-2(1) and 66(1) for supplying power are not used in terminals such as the juncture terminal 65-2 and the first connection terminal 66, and only the terminal parts 65-2(2) and 66(2) and the terminal parts 65-2(3) and 66(3) are used.

While the power supply unit side plug 70A has a case which is the same case as that in the first embodiment, the battery 90 (for example, DC 3 V) is stored within this case. The battery 90 is detachably attached by insertion by a battery cover provided at a side wall of the case being open and closed. The battery 90 is connected between the CPU 75 and the earth terminal 64-2 and drives the CPU 75. Other configuration of the power supply unit side plug 70A is the same as that of the plug 70 in the first embodiment.

While the plurality of SPDs 1A (for example, SPDs 1A-1, 1A-2, . . . ) and the power supply unit 50A are connected with the plurality of juncture plugs 25 (for example, juncture plugs 25-1, 25-2, . . . ) as with the first embodiment, because power is not supplied from the power supply unit 50A to each SPD 1A, only terminal parts (2) and (3) of each juncture plug 25 are used.

(Operation of Second Embodiment)

As illustrated in FIG. 18, (I) operation step 1 and (II) operation step 2 in the case where the plurality of SPDs 1A perform protection operation against lightning surge in a state where the plurality of SPDs 1A (for example, SPDs 1A-1, 1A-2, . . . ) and the power supply unit 50A are connected will be described.

(I) Operation Step 1

For example, when an excessive lightning surge occurs between the external line side line 2-1 or the equipment side line 3-1 and the earth terminal 14-2, as with the first embodiment, the protection circuit 34 within the SPD side plug 1A-1 operates, and the surge current flows through the surge current pathway indicated with the arrow (4) and is discharged to the earth terminal 14-2.

When the surge current is discharged to the earth terminal 14-2, data of the surge current detected at the CT 43 is stored in the memory 42 through the CPU 41. The CPU 41 determines a state of the SPD 1A-1 (that is, a state of the protection circuit 34) by comparing the history of the lightning surge (such as, for example, a degree of the surge current and the number of times of intrusion) stored in the memory 42 with a reference value set in advance and stores the determination result in the memory 42. When the switch 46 is depressed, the CPU 41 turns on any one of the green LED 45*a*, the yellow LED 45*b* and the red LED 45*c* of the display unit 45 according to the determination result stored in the memory 42.

When, for example, it is determined that the SPD 1A-1 is recommended to be replaced or degrades, the CPU 41 puts the transistor 44 into an on state using a control signal. When the transistor 44 is put into an on state, the terminal part (3) and the terminal part (2) of the first connection terminal 16 become conductive, and a current flows through a current pathway for light emitting diode operation as indicated with the following arrow (2):

"Battery 90 of power supply unit 50A→light emitting diode 72→terminal part (3) of first connection terminal 66→terminal part (3) of juncture terminal 65-2→juncture plug 25-1→terminal part (3) of juncture terminal 15 of SPD 1A-1→terminal part (3) of first connection terminal 16→transistor 44→terminal part (2) of first connection terminal 16→terminal part (2) of juncture terminal 15-1→juncture plug 25-1→terminal part (2) of juncture terminal 65-2 of power supply unit 50A→terminal part (2) of first connection terminal 66→earth terminal 64-2"

(II) Operation step 2

When the current flows to the light emitting diode 72 through the current pathway for light emitting diode operation as indicated with the above-described arrow (2), the light emitting diode 72 emits light. When the light emitting diode 72 emits light, the phototransistor 73 is put into an on state, and a current flows from the CPU 75 to the earth terminal 64-2 through the phototransistor 73 through the current pathway for relay operation as indicated with the arrow (3). By this means, the CPU 75 detects that any of the adjacent SPDs 1A-1, 1A-2, . . . is recommended to be replaced or is put into a degradation state (that is, recognizes change of a state of a port) and makes the relay 74 operate. When the relay 74 operates, circuits of the contact output part configured with the contact output terminals 63-1 and 63-2 become conductive, and the above-described detection result of replacement recommendation or the degradation state is contact output to a distance through the contact output signal line 6.

It should be noted that the power supply unit 50A and circuits of the plurality of SPDs 1A-1, 1A-2, . . . adjacent to the power supply unit 50A are connected in parallel. Therefore, the above-described operation of the operation step 1 of (I) is performed between the power supply unit 50A and each of the SPDs 1A-1, 1A-2, . . . adjacent to the power supply unit 50A, and, when it is determined that even one of the SPDs 1A is recommended to be replaced or degrades, a circuit which is the same as the above-described current pathway for light emitting diode operation as indicated with the arrow (2), and which is built between the power supply unit 50A and the SPD 1A for which the problem is detected, operates, and the detection result of the replacement recommendation or degradation determination is contact output to the contact output signal line 6.

(Advantageous Effects of Second Embodiment)

According to the SPD 1A and the surge protective system of the second embodiment, because the detection result detected at the CPU 41 within the SPD 1A is transmitted to the power supply unit 50A through the juncture plug 25 (for example, juncture plugs 25-1, 25-2, . . . ), and is contact output from the power supply unit 50A to the contact output signal line 6, substantially the same advantageous effects as those of the first embodiment are provided. Further, because the second embodiment is an embodiment in which the system is driven by batteries, and it is not necessary to supply power from the power supply unit 50 to each SPD 1 as in the first embodiment, it is possible to reduce troubles for wiring of the power supply path.

Modification of First Embodiment and Second Embodiment

The present invention is not limited to the above-described first and second embodiments, and various usage forms and modifications can be employed. For example, the shape, structure, circuit configuration, or the like, of the SPDs 1 and 1A and the power supply units 50 and 50A are not limited to those illustrated in the drawings, and can be modified.

What is claimed is:

1. A surge protective device comprising:
a jack having an external line side terminal to which an external line configured with a communication line or a control line is connected, an equipment side terminal to which equipment to be protected is connected, a first connection terminal, a second connection terminal, and a juncture terminal connected to the first connection terminal; and
a plug having a third connection terminal detachably connected to the first connection terminal, a fourth connection terminal detachably connected to the second connection terminal, a protection circuit which discharges lightning surge intruding from the external line side terminal or the equipment side terminal through the second connection terminal and the fourth connection terminal to a ground side to protect the equipment to be protected, a degradation detecting unit which detects intrusion of the lighting surge and detects a degradation state of the protection circuit by comparing a history of the lightning surge with a reference value, and a display unit which displays a detection result of the degradation detecting unit;
wherein, when a plurality of the surge protective devices are installed together, a juncture plug which detachably connects between the adjacent juncture terminals in the adjacent surge protective devices is provided, and
the detection result of the degradation detecting unit is output through the third connection terminal, the first connection terminal, the juncture terminal and the juncture plug.

2. The surge protective device according to claim 1,
wherein the juncture plug is disposed at a position where the jack abuts on the plug.

3. The surge protective device according to claim 1,
wherein the history of the lightning surge includes a degree of the lightning surge and the number of times of intrusion.

4. The surge protective device according to claim 2,
wherein the history of the lightning surge includes a degree of the lightning surge and the number of times of intrusion.

5. The surge protective device according to claim 3,
wherein power supply terminals are respectively provided at the jack, the plug and the juncture plug, and
a power supply voltage is supplied to the plug through the power supply terminal of the juncture plug, the power supply terminal of the jack and the power supply terminal of the plug.

6. The surge protective device according to claim 4,
wherein power supply terminals are respectively provided at the jack, the plug and the juncture plug, and
a power supply voltage is supplied to the plug through the power supply terminal of the juncture plug, the power supply terminal of the jack and the power supply terminal of the plug.

7. The surge protective device according to claim 3,
wherein a battery which supplies a power supply voltage to the degradation detecting unit is provided within the plug.

8. The surge protective device according to claim 4,
wherein a battery which supplies a power supply voltage to the degradation detecting unit is provided within the plug.

9. A surge protective system,
wherein a plurality of the surge protective devices according to claim 5 are installed together, and
a power supply unit which supplies the power supply voltage to the plug and transmits the detection result of the degradation detecting unit to an outside is provided.

10. A surge protective system,
wherein a plurality of the surge protective devices according to claim 6 are installed together, and
a power supply unit which supplies the power supply voltage to the plug and transmits the detection result of the degradation detecting unit to an outside is provided.

11. The surge protective system according to claim 9,
wherein a power supply voltage for driving is supplied to the power supply unit from an external power supply.

12. The surge protective system according to claim 10,
wherein a power supply voltage for driving is supplied to the power supply unit from an external power supply.

13. A surge protective system,
wherein a plurality of the surge protective devices according to claim 7 are installed together, and
a power supply unit which transmits the detection result of the degradation detecting unit to an outside is provided.

14. A surge protective system,
wherein a plurality of the surge protective devices according to claim 8 are installed together, and
a power supply unit which transmits the detection result of the degradation detecting unit to an outside is provided.

15. The surge protective system according to claim 13,
wherein a power supply voltage for driving is supplied to the power supply unit by a battery provided inside the power supply unit.

16. The surge protective system according to claim 14,
wherein a power supply voltage for driving is supplied to the power supply unit by a battery provided inside the power supply unit.

* * * * *